Patented Mar. 21, 1944

2,344,621

UNITED STATES PATENT OFFICE 2,344,621

WELD-ROD COATING

Paul C. Lemmerman, Cleveland Heights, Ohio, assignor to E. I. du Pont de Nemours & Company, Wilmington, Del., a corporation of Delaware No Drawing. Application March 26, 1942,
Serial No. 436,317

1 Claim. (Cl. 219—8)

This invention relates to the coating of welding rods and is more particularly directed to novel aqueous potassium silicate solutions having an $SiO_2:K_2O$ mole ratio of about 3.25 and a specific gravity of about 40° Baumé at 60° F., which are particularly adapted to use in welding rod coatings.

In the art of welding, and particularly in electric arc welding, the application of coatings to the metal welding rods employed has been recognized to give definite advantages. A variety of such coatings have been used, the particular compositions of the coatings depending on such factors as the purpose for which the rod is intended and the manner in which it is to be used. Usually the coating includes a slag-forming material such as feldspar, a ferro alloy such as ferro manganese, an arc stabilizer such as titanium oxide, a combusible material capable of forming carbon monoxide under the conditions of use such as wood flour, and a binder for the coatings such as sodium silicate. Such coatings may be applied to the rod simply by dipping the rod into the mixture, but the type of coating applied by extruding the rod together with the coating mixture has met with increasing favor in the welding industry.

Instead of or in addition to sodium silicate potassium silicate has been used as a binder. This has been found particularly advantageous because the potassium content of the silicate increases the conductivity of the arc upon the rod as used in electric welding.

Unfortunately there have been certain disadvantages connected with use of the grades of potassium silicate heretofore available, which have necessitated special precautions or special handling in their use. The potassium silicate heretofore used in welding rod coatings has had an $SiO_2:K_2O$ mole ratio of about 4 and using this potassium silicate, difficulty has been encountered, for instance, in applying the coating composition to the welding rod, since it has been found that if a dilute solution is used in sufficient quantity to give the desired binding action, the mix is too wet and flows too readily, whereas if a concentrated solution is used the potassium silicate gels in a very short time after being mixed with the other ingredients. The mix thereupon loses its plasticity and the coating is brittle after drying. Thus the advantages of using potassium silicate have been offset in part by these difficulties of handling.

Now I have found that welding rod coating mixtures having improved working characteristics and giving strong, non-brittle coatings can be obtained if potassium silicate is added to the coating mixture in the form of a solution having an $SiO_2:K_2O$ mole ratio of about 3.25 and a specific gravity of about 40° Baumé at 60° F.

By employing a novel potassium silicate solution of this invention in conjunction with other ingredients which are customarily included according to prior practices, one may readily produce mixes which are ideally suited for coating welding rods either by dipping or by extrusion. Such mixes have a consistency very well adapted for handling in an extrusion press. On the other hand such mixes maintain their plasticity over a sufficient period of time that no difficulty is encountered due to setting up of the mix prior to its application to the rods. When such coatings are dried they are found to be strong and adherent and it is possible to bend the rods through a considerable angle without cracking off the coating.

The advantages obtained by using a potassium silicate solution of my invention may in part be attributed to the high solids content of such solution. Thus a potassium-silicate solution having a 3.25 $SiO_2:K_2O$ mole ratio and a specific gravity of about 40.5° Baumé at 60° F. contains about 26.2% $SiO_2$ and 12.5% $K_2O$, or a total solids content of about 38.7% by weight. With potassium silicate solutions heretofore available, it has not been feasible to use a more concentrated solution than that having specific gravity of about 30° Baumé at 60° F. At a 4.0 $SiO_2:K_2O$ mole ratio, such a solution would contain 20.8% $SiO_2$ and 8.3% $K_2O$, or a total solids content of about 29.1% by weight. It will be understood, of course, that the advantages of using a composition of my invention are in part explainable on other grounds than the high solids content and that by using less concentrated solutions than 40° Baumé one may also obtain important advantages as compared with using solutions of equivalent concentration having higher $SiO_2:K_2O$ ratios.

Potassium silicate solutions having a 3.25 $SiO_2:K_2O$ mole ratio can be prepared by dissolving a potassium silicate glass of the same ratio in water. When this is done however a certain amount of siliceous precipitate is formed. I have found that this difficulty can be avoided and that potassium silicate solutions of the desired ratio and specific gravity can most advantageously be obtained by dissolving a potassium silicate glass having an $SiO_2:K_2O$ mole ratio of about 4 in aqueous potassium hydroxide solution, preferably at atmospheric pressure and at about 160 to 180° F., the proportions of glass and potassium hydroxide being such as to give the desired 3.25 ratio in the final solution.

Typical of a welding rod coating composition in which a potassium silicate solution of my invention may be employed to advantage is the following:

| Ingredients | Parts by weight |
| --- | --- |
| Wood flour | 25 |
| Titanium oxide | 25 |
| Ferromanganese, powdered | 10 |
| Feldspar, powdered | 15 |
| Potassium silicate solution (3.25 $SiO_2:K_2O$ mole ratio, 40° Baumé at 60° F. solution) | 25 |

It will be understood that the above mixture for coating welding rods is only typical and advantages may be obtained by using a novel potassium silicate solution of my invention in a variety of such compositions.

While in the foregoing description of this invention there have been set forth certain specific potassium silicate solutions, it will be understood that without departing from the spirit of this invention one skilled in the art may employ numerous processes and produce numerous compositions.

I claim:

A welding rod coated with a material comprising potassium silicate having an $SiO_2:K_2O$ mole ratio of about 3.25.

PAUL C. LEMMERMAN.